Sept. 15, 1953         H. TILLER                2,651,970
            HIGHLY CORRECTED IMAGE PRODUCING
Filed Aug. 17, 1949   PHOTOGRAPHIC OBJECTIVE SYSTEM
                                              2 Sheets-Sheet 1
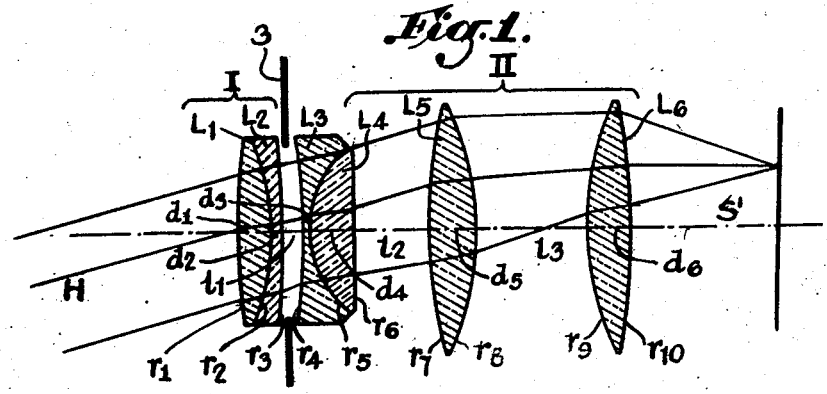
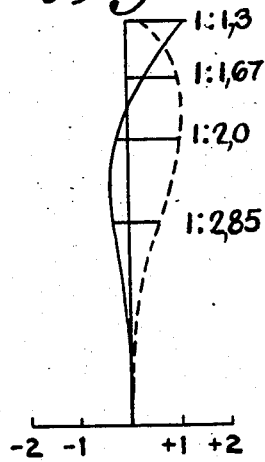
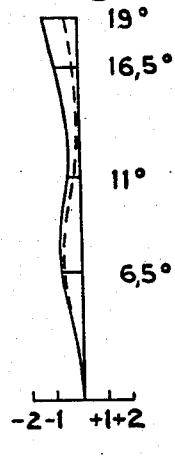
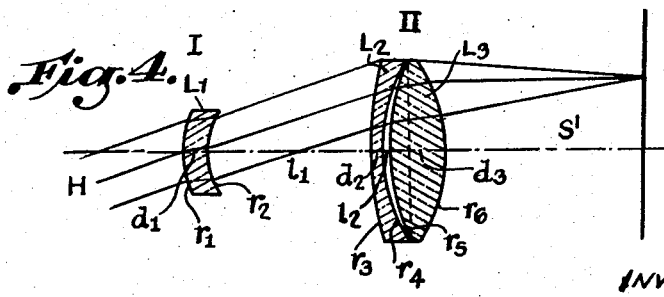
INVENTOR
HANS TILLER
BY Hammond & Littell
ATTORNEYS

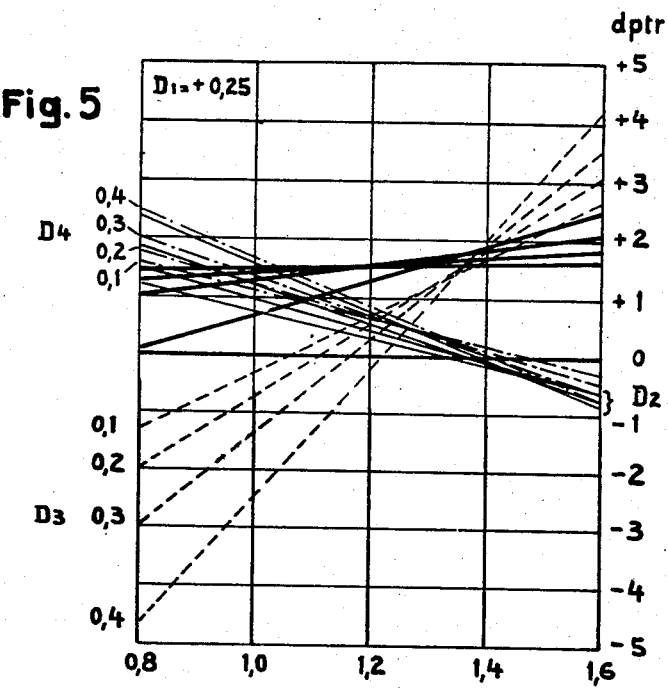
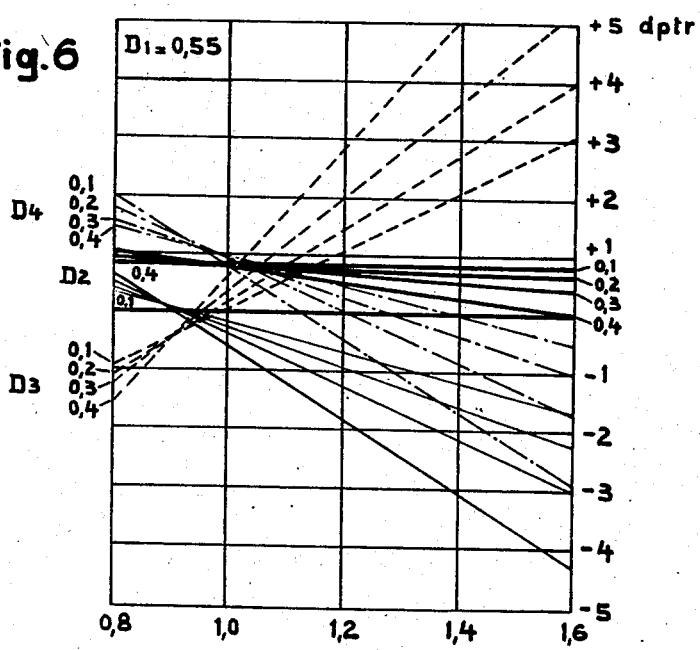

Patented Sept. 15, 1953

2,651,970

UNITED STATES PATENT OFFICE 2,651,970

HIGHLY CORRECTED IMAGE PRODUCING PHOTOGRAPHIC OBJECTIVE SYSTEM

Hans Tiller, Zurich, Switzerland, assignor to Cycloptic Anstalt für Optik und Mechanik, Vaduz, Liechtenstein Application August 17, 1949, Serial No. 110,718
In Switzerland August 24, 1948

4 Claims. (Cl. 88—57)

This invention relates to optical systems and particularly a system including two sub-systems, the dimensional relationship of the various parts of the systems being particularly chosen.

Image producing spherically and chromatically corrected optical systems having one portion of the entire system on the object-side and another portion thereof on the image-side have already been described in a previous patent application. The principal rays with pencils or rays are deflected towards the optical axis by the portion of the system on the image-side, the portion of the system on the object-side determining substantially the aperture ratio, and the portion on the image-side determining substantially the focal length of the system.

One of the objects of the invention is to produce an improved optical system of greater luminous effect upon the image plane and producing sharper images.

In one aspect of the invention, the lens system can consist of two sub-systems separated by an air space, the system being characterized by the fact that its total structural length is between at least 0.8 times and at the most 2 times the total focal length of the entire assembly or objective while the focal length of the front lens, or the portion on the side of the object, is greater than said total focal length, and the focal length of the sub-system or lens assembly on the image-side differs not more than 20% from said total focal length.

Computation has shown that when the above mentioned conditions are fulfilled, lens systems may be provided having optical properties superior to those of the holo- and hemi-symmetrical doublets, triplets and their previously known derived forms. In particular, small values may be chosen for the refractive indices of the individual lenses so that the costs of production are low without involving too large a Petzval value determining the curvature of the image.

Division of the entire system according to the invention in two part-systems such that the course of the rays of the first sub-system substantially determines the ratio of aperture, and the second sub-system determines substantially the focal length, the second sub-system being active on the pencils of rays coming from the first sub-system such that they are deflected towards the optical axis of the system. Inasmuch as the focal length of the sub-system on the image side differs but little (maximum 20%) from that of the entire system, the aperture of the system is essentially determined by the sub-system on the object side, while the focal length of the entire system is essentially determined by the sub-system on the image side. Such an arrangement involves a distribution of the refractive forces of the individual lenses of the second sub-system in order to fulfill the image creating condition and to attain the desired course of the rays.

The pencil of rays entering the first sub-system are preferably deflected in such manner that their main rays continue towards the image plane in substantially parallel condition in relation to each other and in relation to the axis of the system so that the rays take a telescopic course on the image side.

The main plane of the object-side portion facing the image or second portion falls by the condition described exactly or at least substantially together with the front focal point of the second portion.

If the refractive force of the first sub-system exceeds a certain magnitude such that the focal length becomes too short then the image produced by this system would fall in or ahead of the second sub-system and the creation of a real image required for photographic use would not be possible.

In the drawings:

Fig. 1 shows one form of the invention.

Fig. 2 is a graph showing the spherical aberration correction.

Fig. 3 is a graph showing the inclination of the image field as a function of the inclination of the incident rays, the continuous dashed lines showing the sagittal and meridional image points respectively.

Fig. 4 shows another form of the invention.

Figs. 5 and 6 are graphs showing the relation of the refractive forces to structure length.

The drawings show two embodiments of the lens system of the invention. Referring to Fig. 1, the sub-system I on the object side of the lens system, which is compensated for both spherical and chromatic aberration, is composed of two lenses $L_1$, $L_2$ connected together such as by cementing. Sub-system II, which is separated from said sub-system I by an air space, consists of three parts equally separated from one another by air spaces, and comprises the lenses $L_3$, $L_4$, $L_5$, $L_6$. The lenses of sub-system II deflect the principal rays, which have entered sub-system I, towards the optical axis in such a manner that the angle of incidence of these rays to the image plane is 90° or approximately 90°. The diaphragm 3 is arranged between sub-system I on the object side and sub-system II. When the principal rays emerge from sub-system II in telescopic relation, the diaphragm 3 lies at the anterior focus of the image-side sub-system II and at the same time in the rear principal plane of sub-system I. When the principal rays do not emerge from sub-system II in entirely parallel relation, there occurs a slight displacement of the location of the diaphragm.

The requirements set forth call for four individual systems, i. e. one for the front part-system and three for the rear part-system. In the following tables, which are merely for the purpose of examples to indicate how to calculate values for the parts, the values for the refractive forces D relating to various values of the distance $a_{12}$ of the first single system from the next system are given: the distance $a_{23}$ between the second and third and fourth individual systems are equal and their value results also from the total structural length which remains unchanged.

Predetermined values:

Total focal length=refractive power=1
Focal intercept at the image-side=0.2×focal length
Length of system=0.8×focal length
Refractive power of the first part-system=0.25= 4×focal length.

$D_1$=refractive power=$\frac{1}{\text{focal length}}$ of the lens 1

$D_2$=refractive power=$\frac{1}{\text{focal length}}$ of the lens 2

$D_3$=refractive power=$\frac{1}{\text{focal length}}$ of the lens 3

$D_4$=refractive power=$\frac{1}{\text{focal length}}$ of the lens 4

$a_{12}$=distance between lens 1 and lens 2
$a_{23}$=distance between lens 2 and lens 3
$a_{34}$=distance between lens 3 and lens 4

| $a_{12}=$ | 0.1 | 0.2 | 0.3 | 0.4 |
|---|---|---|---|---|
| $D_2=$ | +1.169 | +1.456 | +1.841 | +2.378 |
| $D_3=$ | −1.259 | −1.938 | −2.980 | −4.667 |
| $D_4=$ | +1.536 | +1.731 | +2.015 | +2.439 |
| total | +1.446 | +1.249 | +0.876 | +0.150 |

If it is assumed that the refractive power of the first portion of the system is 0.55=1.8×the total focal length, the following values are obtained:

| $a_{12}$ | 0.1 | 0.2 | 0.3 | 0.4 |
|---|---|---|---|---|
| $D_2=$ | +0.623 | +0.793 | +1.037 | +1.406 |
| $D_3=$ | −1.037 | −1.375 | −1.877 | −2.667 |
| $D_4=$ | +1.502 | +1.646 | +1.859 | +2.439 |
| total | +1.088 | +1.064 | +1.019 | +1.178 |

The additional requirement that the image curvature is to be kept as small as possible is analogous to the Petzval requirement, which says that the sum of the refractive forces are not to exceed a predetermined value. This reduces the number of systems within the inventive thought, in that some systems may meet the requirements set forth but are unfavorable in view of error-correction.

In that by reduction of the distance $a_{12}$ the sum of the refractive forces becomes greater than the distance $a_{23}+a_{24}$ and therewith the total structural length is limited to a predetermined minimal value. From the Figures 5 and 6, in which the refractive forces are plotted in function of the structure-length, it may be seen that the refractive forces are being maintained only in the middle range of the structural length small enough to permit error-correction and also to permit realization of economical advantages.

The cost of manufacture of the lenses depends on their curvatures, and only relatively small single-refractive forces require curvatures suitable for lenses to be manufactured at low cost. Limitation of the structural length is determined by the magnitude of the refractive values and this magnitude of the refractive values determines the required suppression of image errors. As an example, the embodiment hereafter described shows that with a simple structure, a good error-correction is realized.

Systems which deflect the principal rays towards the optical axis, as described, are of advantage in that the luminous reduction from the geometric nature of the system is considerably smaller compared with systems in which the principal rays fall at a greater slant upon the image plane. This results from the facts that the luminous effect upon the image plane varies with the cosine of the angle, under which the rays fall upon the image plane.

It has been found that without an increase in number of the lenses applied, the reduction of illuminating power in marginal direction for systems according to this invention is very small, and in case the single-refractive powers of the required individual lenses is made smaller than for lenses customarily used the suppression of errors is advantageously effected. For example, while in case of triplets (Berek, Grundlagen der Praktischen Optik, 1930), the refractive powers of the positive portions of the system are at least twice as great as the refractive powers of the whole system, for the present system the single-refractive powers are smaller than for the whole system; it is therefore possible to produce systems of greater luminous effect upon the image plane and of larger sharply defined image portions.

The total structure-length is 80.2 and the total focal length is 45.3 giving a ratio of 1.77 of the total structure length to the total focal length. The focal length of the front system portion I is 383.0 and therefore greater than the total focal length.

The focal distance of the image-side portion consisting of three parts is 45.1 and differs therefore from the total focal length by 0.5%.

The distance of the principal points facing each other of the portions I and 2 is 52.79, i. e. 1.16 times the focal length.

Figs. 2 and 3 graphically show the extent to which this lens system has been compensated; the continuous curve in Fig. 2 showing the spherical aberration, and the dashed curve the deviation from the sine requirement as a function of the aperture. Fig. 3 shows the curvature of the image field as a function of the inclination of the incident rays, the continuous and dashed curves showing the sagittal and meridional image points respectively.

Another example of the invention is shown in Fig. 4 wherein the first portion I consists of a negative lens and the second portion consists of two air-spaced individual lenses. The focal length of the first portion I is $f_1=-201.4$, the focal length of second portion 2 is $f_2=+46.0$, and the entire focal length is $F=48.0$. The total structure length is 52.0, and the distance between the two portions $a_{12}=31.9$. The total structure length is therefore 1.08 times the focal length and the focal length of the first portion is—in absolute measurement—greater than the total focal length, and the focal length of the second portion varies 4% of the total focal length.

Suitable ordinary glass or infrared or ultraviolet transmitting material may be used for the manufacture of the individual lenses, depending upon whether infrared or ultraviolet light is desired to be effective on the image plane. Glass material of other transmitting qualities such as yellow glass or other glass with certain filtering qualities may also be used.

Since the functions of the front sub-system and the rear sub-system are different, it is possible to exchange said front sub-system. Thus it is possible to change the ratio of aperture or the last focal intercept of the entire system (for special duty cameras) or also to change the type of image (i. e. by a soft lens) while the other conditions remain unchanged.

I claim:

1. In a photographic objective lens unit, the combination comprising a front lens on the object-side determining substantially the aperture ratio of the whole lens system, being positioned substantially together with the front focal point of the rear lens portion, and a lens assembly on the image-side separated from said front lens by an air space, characterized by having the principal rays with their associated pencils of rays which are incident upon said front lens deflected towards the optical axis by said image-side lens assembly, the overall length of said objective being between at least 0.8 and at most 2 times the total focal length of said objective, while the focal length of said image-side lens assembly differs by an amount not exceeding 20% from the total focal length of the objective.

2. In a photographic objective lens unit, the combination comprising a front lens on the object-side determining substantially the aperture ratio of the whole lens system, being positioned substantially together with the front focal point of the rear lens portion, and a lens assembly on the image-side separated from said front lens by an air space, characterized by having the principal rays with their associated pencils of rays which are incident upon said front lens deflected towards the optical axis by the said image-side lens assembly, the overall length of said objective being between at least 0.8 and at most 2 times the total focal length of said objective, while the focal length of said image-side lens assembly differs by an amount not exceeding 20% from the overall focal length of said objective, and further characterized by having the front lens consist of a negative lens.

3. In a photographic objective lens unit, comprising a front lens on the object-side determining substantially the aperture ratio of the whole lens system, being positioned substantially together with the front focal point of the rear lens portion, and a lens assembly on the image-side separated from said front lens by an air space, characterized by having the principal rays with their associated pencils of rays which are incident upon said front lens deflected towards the optical axis by said image-side lens assembly, the overall length of said objective being between at least 0.8 and at most 2 times the total focal length of said objective, while the focal length of said image-side and lens assembly differs by an amount not exceeding 20% from the total focal length of said objective, and further characterized by having the image-side lens assembly comprising at least one positive and one negative individual lens.

4. In a photographic objective lens unit, the combination comprising a front lens on the object-side determining substantially the aperture ratio of the whole lens system, being positioned substantially together with the front focal point of the rear lens portion, consisting of a negative and a positive lens and a lens assembly on the image-side separated from said front lens by an air space, characterized by having the principal rays with their associated pencils of rays which are incident upon said front lens deflected towards the optical axis by said image-side lens assembly, the overall length of said objective being between at least 0.8 and at most 2 times the total focal length of said objective, while the focal length of said image-side and lens assembly differs by an amount not exceeding 20% from the total focal length of said objective.

HANS TILLER.

References Cited in the file of this patent

UNITED STATES PATENTS

| Number | Name | Date |
|---|---|---|
| 660,202 | Rudolph | Oct. 23, 1900 |
| 660,747 | Bausch | Oct. 30, 1900 |
| 1,540,752 | Bielicke | June 9, 1925 |
| 1,877,355 | Minor | Sept. 13, 1932 |
| 1,888,156 | Bielicke | Nov. 15, 1932 |
| 2,394,959 | Wynne | Feb. 12, 1946 |
| 2,445,594 | Bennett | July 20, 1948 |
| 2,502,544 | Warmisham | Apr. 4, 1950 |

FOREIGN PATENTS

| Number | Country | Date |
|---|---|---|
| 403,706 | Germany | Oct. 7, 1924 |
| 299,983 | Great Britain | Nov. 8, 1928 |
| 372,228 | Great Britain | May 5, 1932 |
| 271,419 | Switzerland | Jan. 16, 1951 |